United States Patent
Shiriike

(10) Patent No.: US 7,901,313 B2
(45) Date of Patent: Mar. 8, 2011

(54) POWER TRANSMISSION BELT AND PROCESS FOR PRODUCTION OF THE SAME

(75) Inventor: Hiroyuki Shiriike, Kobe (JP)

(73) Assignee: Bando Chemical Industries, Ltd., Kobe-shi (JP)

( * ) Notice: Subject to any disclaimer, the term of this patent is extended or adjusted under 35 U.S.C. 154(b) by 450 days.

(21) Appl. No.: 11/597,389

(22) PCT Filed: May 23, 2005

(86) PCT No.: PCT/JP2005/009824
§ 371 (c)(1), (2), (4) Date: Nov. 24, 2006

(87) PCT Pub. No.: WO2005/116482
PCT Pub. Date: Dec. 8, 2005

(65) Prior Publication Data
US 2007/0249450 A1    Oct. 25, 2007

(30) Foreign Application Priority Data
May 25, 2004    (JP) ................. 2004-154481

(51) Int. Cl.
C08K 7/02    (2006.01)
F16G 1/08    (2006.01)
(52) U.S. Cl. ........................................ 474/260
(58) Field of Classification Search .......... 474/260, 474/263, 266
See application file for complete search history.

(56) References Cited

U.S. PATENT DOCUMENTS

| | | | |
|---|---|---|---|
| 5,223,311 A * | 6/1993 | Tsutsumi et al. | 427/388.1 |
| 5,610,217 A * | 3/1997 | Yarnell et al. | 524/397 |
| 6,358,171 B1 * | 3/2002 | Whitfield | 474/266 |
| 2002/0187869 A1 * | 12/2002 | Martin et al. | 474/260 |

FOREIGN PATENT DOCUMENTS

| | | |
|---|---|---|
| JP | 4-269526 A | 9/1992 |
| JP | 2000-334856 A | 12/2000 |
| JP | 2003-12871 A | 1/2003 |
| JP | 2003012871 A * | 1/2003 |
| JP | 2003-145637 A | 5/2003 |
| JP | 2003-181946 A | 7/2003 |

OTHER PUBLICATIONS

Takehara et al (JP2003012871), English translation.*
International Search Report of PCT/JP2005/009824, dated Aug. 9, 2005.

* cited by examiner

Primary Examiner — Robert A Siconolfi
Assistant Examiner — Stephen Bowes
(74) Attorney, Agent, or Firm — Hamre, Schumann, Mueller & Larson, P.C.

(57) ABSTRACT

A power transmission belt comprises a compression rubber layer and an adhesion rubber layer both of which are formed of vulcanizate of an ethylene-a-olefin-diene rubber compound, with a preferred ethylene content of 55-85% in the compression rubber layer. A plurality of load carrying cords formed of fiber cords adhere to and embed in the adhesion rubber layer. The compression rubber layer has a modulus of elasticity in tension of a in the lengthwise direction of the belt and a modulus of elasticity in tension of b in the widthwise direction of the belt, and a and b satisfy the relationship: $0.9 \leq a/b \leq 1.2$. The compression rubber layer may contain short fibers therein in an amount of not more than 5 parts by weight in relation to 100 parts by weight of the ethylene-a-olefin-diene rubber, used in such a manner that the fibers are oriented in the lengthwise direction of the belt.

2 Claims, 2 Drawing Sheets

POWER TRANSMISSION BELT AND PROCESS FOR PRODUCTION OF THE SAME

FIELD OF THE INVENTION

The invention relates to a power transmission belt and a process for production of the same. More particularly, the invention relates to a power transmission belt in which the amount of short fibers contained in a compression rubber layer is remarkably reduced so that it can be produced with a reduced cost, and besides it runs with a reduced noise and is superior in resistance to flexural fatigue in high temperature environment. The invention further relates to a process for production of such a power transmission belt.

DESCRIPTION OF PRIOR ART

Rubber components of a power transmission belt used mainly in automobiles, such as V-belt and a V-ribbed belt of a low edge type, are formed of vulcanizate of compound of a chlorosulfonated polyethylene rubber mixed with chloroprene rubber or a hydrogenated nitrile rubber and containing short fibers because of superiority of the vulcanizate in resistance to heat, oil and abrasion, among others.

In particular, in such a power transmission belt, short fibers are contained in an amount of 20 parts by weight or more in relation to 100 parts by weight of the rubber component of the compression rubber for the purpose mentioned below. That is to say, the short fibers are dispersed in a compression rubber layer so that they are oriented in the widthwise direction of the belt to improve resistance to pressure from the lateral direction and to suppress undesirable transformation of the belt while it is running, thereby improving transmission efficiency of the belt. Further, the short fibers are protruded from the surface of the compression rubber layer in contact with a pulley to decrease the noise or sound caused by friction of the compression layer with the pulley when the belt is running. Besides, there is a tendency that the amount of short fibers contained in a compression rubber layer increases on account of increasing demand for silence when an automobile is driven.

By way of examples, JP 2003-012871A describes a power transmission belt in which the compression rubber layer is formed of vulcanizate of an ethylene-α-olefin-diene rubber compound containing 10-30 parts by weight of short fibers having a length of 0.5-3 mm in relation to 100 parts by weight of ethylene-α-olefin-diene rubber and oriented in the widthwise direction of the belt.

A power transmission belt having a compression rubber layer which is formed of vulcanizate of ethylene-α-olefin-diene rubber compound containing short fibers that are oriented in the widthwise direction of the belt is liked since it makes only a small noise and it is superior in resistance to flexural fatigue when it is running.

However, many steps are needed to obtain such a conventional compression rubber layer in which short fibers are dispersed in such a manner as mentioned above. That is, such a step is needed to subject short fibers to be used to adhesion treatment in advance. In addition, such a step is also needed to blend the thus adhesion-treated short fibers uniformly with an unvulcanized rubber compound which is to form a compression rubber layer, and roll the unvulcanized rubber compound to a sheet so that the short fibers are oriented in the lengthwise direction of the sheet (that is, the grain direction of the sheet), and then to wind the sheet of unvulcanized rubber compound which is to form a compression rubber layer on the sheet of unvulcanized rubber compound which is to form an adhesion rubber layer so that the grain direction of the sheet of unvulcanized rubber compound which is to form a compression rubber layer crosses at right angles with the circumferential direction of the molding cylinder (i.e., in the lengthwise direction of the resulting belt), and as results, the short fibers are oriented in the widthwise direction in the thus resulting belt.

The production of the conventional power transmission belt in which a compression rubber layer has short fibers dispersed therein needs many complicated steps in this way, while the short fibers are also expensive, and hence such a power transmission belt is very costly.

The invention has been accomplished to solve the above-mentioned problems involved in the conventional power transmission belt in which the compression rubber layer has short fibers dispersed therein and oriented in the widthwise direction of the belt. Therefore, it is an object of the invention to provide a power transmission belt in which either a compression rubber layer contains no short fibers or a compression rubber layer has short fibers only in a remarkably reduced amount oriented in the lengthwise direction of the belt, and furthermore, in which the compression rubber layer has a modulus of elasticity in tension of a in the lengthwise direction of the belt and a modulus of elasticity in tension of b in the widthwise direction of the belt, and the values a and b satisfy the relationship: $0.9 \leq a/b \leq 1.2$. The power transmission belt of the invention as mentioned above can be produced inexpensively in production steps simplified and reduced in number, and yet it runs with a reduced noise, which is in particular caused by friction of the belt with a pulley, and it is superior in resistance to flexural fatigue in high temperature environment, and hence has an elongated flexural life. It is a further object of the invention to provide a process for production of such a power transmission belt.

SUMMARY OF THE INVENTION

The invention provides a power transmission belt which comprises a compression rubber layer and an adhesion rubber layer both of which are formed of a vulcanizate of an ethylene-α-olefin-diene rubber compound, and which has a plurality of load carrying cords adhered to and embedded in the adhesion rubber layer, wherein the compression rubber layer has a modulus of elasticity in tension of a in the lengthwise direction of the belt and a modulus of elasticity in tension of b in the widthwise direction of the belt, and a and b satisfy the relationship: $0.9 \leq a/b \leq 1.2$.

According to the invention, the ethylene-α-olefin-diene rubber that is a rubber component of the compression rubber layer has an ethylene content of 55-85% by weight, preferably 60-80% by weight. Further according to the invention, the compression rubber layer may be formed of vulcanizate of an ethylene-α-olefin-diene rubber compound containing short fibers. In this case, the ethylene-α-olefin-diene rubber compound contains short fibers in an amount of not more than 5 parts by weight in relation to 100 parts by weight of the ethylene-α-olefin-diene rubber.

As a preferred embodiment, the invention provides a power transmission belt in which a compression rubber layer is formed of vulcanizate of an ethylene-α-olefin-diene rubber compound containing ultra high molecular weight polyethylene in an amount of 1-50 parts by weight in relation to 100 parts by weight of the ethylene-α-olefin-diene rubber and the ethylene-α-olefin-diene rubber has an ethylene content of not less than 55% by weight and not less than 60% by weight.

The invention further provides a process for production of a power transmission belt which comprises:

winding a sheet of rubberized canvas and a first sheet of unvulcanized ethylene-α-olefin-diene rubber compound which is to form an adhesion rubber layer on the surface of a molding cylinder so that the lengthwise direction of the sheet is coincident with the circumferential direction of the molding cylinder;

winding a plurality of load carrying cords spirally on the first sheet, and then a second sheet of unvulcanized rubber compound which is to form an adhesion rubber layer so that the lengthwise direction of the sheet is coincident with the circumferential direction of the molding cylinder;

winding a third sheet of unvulcanized ethylene-α-olefin-diene rubber compound which is to form a compression rubber layer on the second sheet so that the lengthwise direction of the third sheet is coincident with the circumferential direction of the molding cylinder, thereby preparing a cylindrical laminate;

heating the cylindrical laminate under pressure to vulcanize the first and the second sheets of an unvulcanized ethylene-α-olefin-diene rubber compound which are to form an adhesion rubber layer and the third sheet of unvulcanized ethylene-α-olefin-diene rubber compound which is to form a compression rubber layer, thereby providing a power transmission belt; in which the ethylene-α-olefin-diene rubber in the ethylene-α-olefin-diene rubber compound which is to form a compression rubber layer has an ethylene content of 55-85% by weight, preferably 60-80% by weight.

The unvulcanized ethylene-α-olefin-diene rubber compound which is to form a compression rubber layer may contain short fibers in an amount of not more than 5 parts by weight in relation to 100 parts by weight of the ethylene-α-olefin-diene rubber.

According to one of the preferred embodiments of the process for production of the power transmission belt, the unvulcanized ethylene-α-olefin-diene rubber compound which is to form a compression rubber layer contains ultra high molecular weight polyethylene, and the ethylene-α-olefin-diene rubber has an ethylene content of not less than 55% by weight and less than 60% by weight, and the content of the ultra high molecular weight polyethylene in the compound is 1-50 parts by weight in relation to 100 parts by weight of the ethylene-α-olefin-diene rubber.

DESCRIPTION OF PREFERRED
EMBODIMENTS OF THE INVENTION

Figure 1:
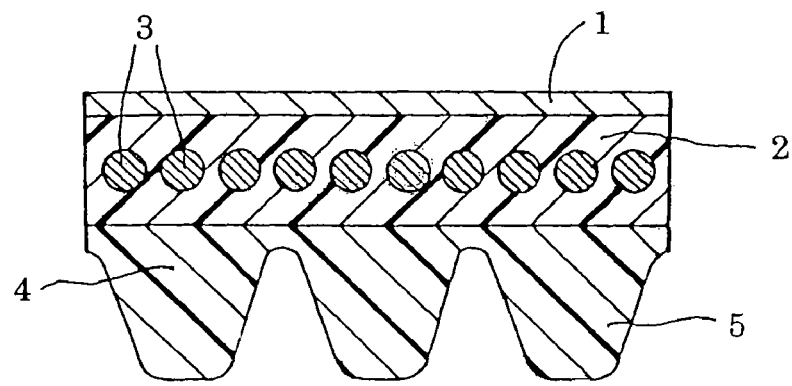
FIG. 1 shows a cross-section of an example of a V-ribbed belt.
Figure 3:
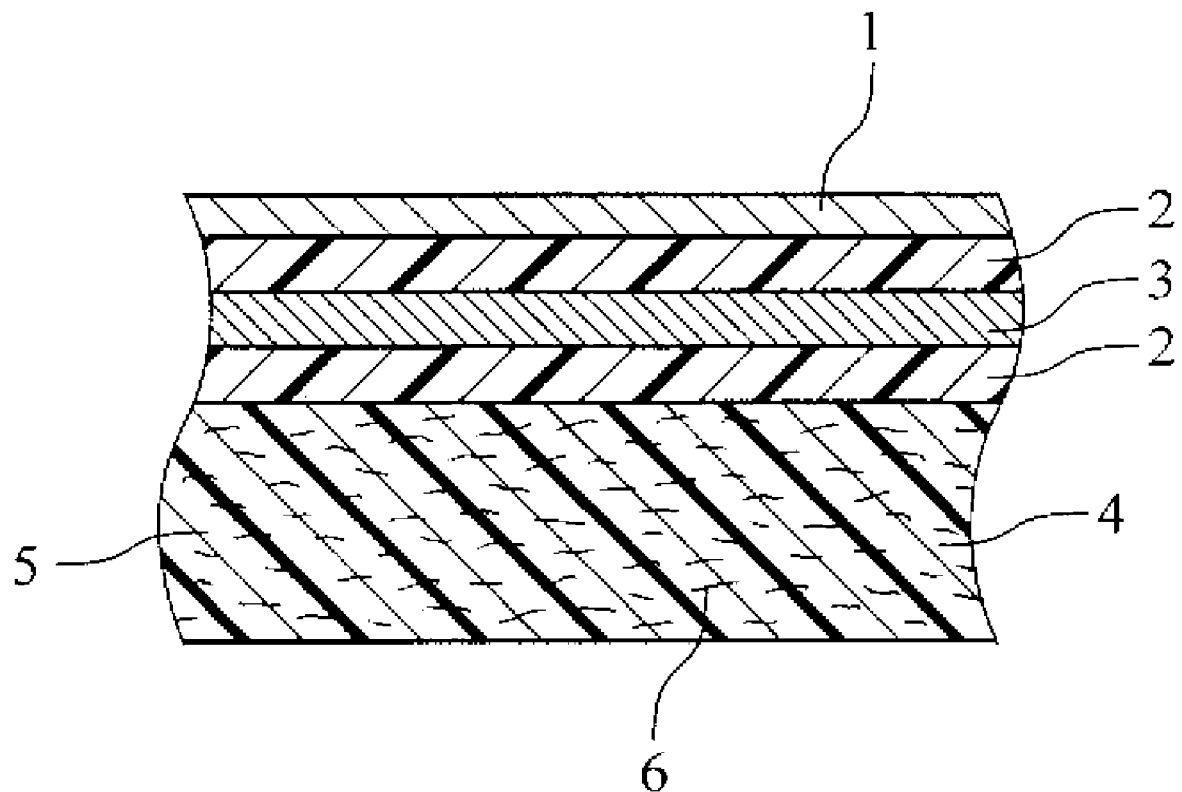
FIG. 3 shows a cross-section of an example of a V-ribbed belt with short fibers.

The power transmission belt includes herein the invention V-ribbed belts and V-belts. FIG. 1 shows a cross section of a V-ribbed belt as an example of the power transmission belt of the invention. The belt has an upper face covered with one or more sheets of rubberized reinforcing fabric or canvas 1. In adjacent to the upper face, the belt has an adhesive rubber layer 2 in which a plurality of fiber cords 3 are embedded, laterally apart and extending in the longitudinal direction of the belt. In turn, a compression rubber layer 4 that has a plurality of ribs 5 is laminated on the adhesive rubber layer. The ribs are laterally apart and extend in the longitudinal direction of the belt. According to the invention, the compression rubber layer may have short fibers 6 (shown in FIG. 3) in an amount of 0-5 parts by weight in relation to 100 parts by weight of the ethylene-α-olefin-diene rubber dispersed and oriented along the lengthwise direction of the belt as mentioned above.

The power transmission belt of the invention comprises a compression rubber layer and an adhesion rubber layer both of which are formed of an vulcanizate of ethylene-α-olefin-diene rubber compound. A plurality of load carrying cords are embedded in and bonded to the adhesion rubber layer.

The load carrying cords are preferably formed of fibers having large strength and low elongation, such as fibers of polyester, aramid, glass fibers, etc. The load carrying cords are usually adhesion-treated in such a manner that they are dipped in resorcin-formalin-latex (RFL) and then heated and dried to form a uniform adhesive layer on the surface of the load carrying cords before they are used. If necessary, before the adhesion treatment, the load carrying cords may be dipped in a solution of a polyfunctional isocyanate compound or a polyfunctional epoxy compound and then heated and dried as a pretreatment.

The ethylene-α-olefin-diene rubber used in the invention to form an adhesion rubber layer and a compression rubber layer is a copolymer rubber formed of ethylene, an α-olefin except ethylene and a diene (non-conjugated diene). The α-olefin used is preferably at least one of propylene, butene, hexene and octene. Preferred ethylene-α-olefin-diene rubber used in the invention is ethylene-propylene-diene rubber. The diene component used is not specifically limited, but is usually a non-conjugated diene such as 1,4-hexadiene, dicyclopentadiene or ethylidenenorbornene (ENB). The diene component is used usually in an amount of 0.1-5.0% by weight based on the ethylene-α-olefin-diene rubber.

The ethylene-α-olefin-diene rubber used in the invention to form an adhesion rubber layer is also not specifically limited, but an ethylene-α-olefin-diene rubber which has an ethylene content of 50-60% by weight is usually used. On the other hand, the ethylene-α-olefin-diene rubber used in the invention to form a compression rubber layer is usually such that it has an ethylene content of 55-85% by weight, and particularly such that it has an ethylene content of 60-80% by weight so that a power transmission belt is obtained in which a compression rubber layer contains no short fibers or contains only a remarkably reduced amount, and in addition, which runs softly with a reduced noise but also which is superior in strength and hardness.

However, when an ethylene-α-olefin-diene rubber having an ethylene content of not less than 55% by weight and less than 60% by weight is used to form a compression rubber layer, the resulting belt makes a larger noise than when an ethylene-α-olefin-diene rubber having an ethylene content of not less than 60% by weight is used to form a compression rubber layer. Thus, when an ethylene-α-olefin-diene rubber having an ethylene content of not less than 55% by weight and less than 60% by weight is used to form a compression rubber layer, it is preferred that ultra high molecular weight polyethylene is contained in an amount of 1-50 parts by weight, more preferably, in an amount of 5-20 parts by weight, in relation to 100 parts by weight of the ethylene-α-olefin-diene rubber used in the compression rubber layer.

When an ethylene-a-olefin-diene rubber having an ethylene content of not less than 55% by weight and less than 60% by weight is used in combination with ultra high molecular weight polyethylene to form a compression rubber layer in this way, the level of noise made when the resulting belt runs can be dropped to almost the same level as the level when an ethylene-a-olefin-diene rubber having an ethylene content of not less than 60% by weight is used without adversely affecting the desired properties of the resulting belt. Also in the case wherein an ethylene-a-olefin-diene rubber having an ethylene content of not less than 55% by weight and not less than 60% by weight is used in combination with ultra high molecular weight polyethylene to form a compression rubber layer in this way, short fibers may be used in an amount of 0-5 parts by weight in relation to 100 parts by weight of the ethylene-a-olefin-diene rubber used. Herein the invention, the ultra high molecular weight polyethylene is such a polyethylene that has a weight average molecular weight in the range of 1000000-5000000 g/mol.

However, when the amount of ultra high molecular weight polyethylene contained in an ethylene-α-olefin-diene rubber is more than 50 parts by weight in relation to 100 parts by weight of the ethylene-α-olefin-diene rubber used, the resulting ethylene-α-olefin-diene rubber compound containing ultra high molecular weight polyethylene in such an amount may provide a sheet which has not a smooth surface when it is rolled, and what is worse, the resulting belt having such a compression rubber layer is inferior in resistance to flexural fatigue.

An organic peroxide is preferably used as a vulcanizing agent for ethylene-α-olefin-diene rubber in the invention, and if necessary, a co-crosslinking agent is used. The organic peroxide used includes, for example, diacyl peroxide, peroxyester, t-butylcumyl peroxide, dicumyl peroxide, 2,5-dimethyl-2,5-di(t-butylperoxy)hexane-3,1,3-bis(t-butylperoxyisopropyl)benzene, and 1,1-dibutyperoxy-3,3,5-trimethylcyclohexane, among others. The organic peroxide is used usually in an amount of 1-10 parts by weight, preferably in an amount of 1.5-5 parts by weight, in relation to 100 parts by weight of ethylene-α-olefin-diene rubber used.

In turn, the co-crosslinking agent used includes, for example, TAC, 1,2-polybutadiene, unsaturated carboxylic acid metal salts, oximes, guanidine, trimethylolpropane trimethacrylate, N,N-m-phenylene bismaleimide, and sulfur, etc. The amount of the co-crosslinking agent used depends on the kind thereof and cannot be determined unconditionally, however, when N,N-m-phenylene bismaleimide is taken as an example, it is used usually in an amount of 0.2-10 parts by weight in relation to 100 parts by weight of the ethylene-α-olefin-diene rubber used, and on the other hand, in the case of sulfur, it is used usually in an amount of 0.01-1 parts by weight in relation to 100 parts by weight of the ethylene-α-olefin-diene rubber used.

In the invention, sulfur is used also as a vulcanizing agent. In this case, sulfur is used usually in an amount of 1.5-10 parts by weight in relation to 100 parts by weight of the ethylene-α-olefin-diene rubber used. If necessary, a vulcanization accelerator is used in an amount of 1.5-10 parts by weight in relation to 100 parts by weight of the ethylene-α-olefin-diene rubber used.

Short fibers used are preferably Nylon 6, Nylon 66, polyester, cotton or aramid fibers. It is preferred that they have a fiber diameter of 10-100 μm, preferably 20-60 μm, a fiber length of 0.1-5 mm, preferably, 0.5-3 mm. As mentioned hereinbefore, a compression rubber layer may contain short fibers in an amount of not more than 5 parts by weight in relation to 100 parts by weight of the ethylene-α-olefin-diene rubber used.

When the amount of short fibers contained in a compression rubber layer is more than 5 parts by weight in relation to 100 parts by weight of ethylene-α-olefin-diene rubber used and the short fibers are oriented in the lengthwise direction of the belt, the modulus of elasticity of the rubber is remarkably different from that of the short fibers in the resulting belt. Accordingly, when bending stress is applied to the belt while it is running, the stress is concentrated to the interface of the rubber and the short fibers where cracks start to occur and they then grow promptly. As consequence, cracks are generated in the compression rubber layer. Thus, the resultant belt is inferior in resistance to flexural fatigue, and hence it has a reduced flexural life.

In a power transmission belt having a compression rubber layer which has short fibers dispersed in the compression rubber layer and oriented in the lengthwise direction of the belt, the amount of the short fibers contained in the compression rubber layer is correlated with an a/b ratio in which a is a modulus of elasticity in tension of the compression rubber layer in the lengthwise direction and b is a modulus of elasticity in tension of the compression rubber layer in the widthwise direction in the resulting power transmission belt, and the a/b ratio is in turn correlated with resistance to flexural fatigue of the belt in high temperature environment.

That is, as the amount of the short fibers contained in a compression rubber layer increases, the a/b ratio becomes large, and when the a/b ratio is in a range of $0.9 \leq a/b \leq 1.2$, the resulting belt makes only a reduced noise and has an improved resistance to flexural fatigue, and hence the belt has an elongated flexural life when it runs. On the other hand, when the a/b ratio exceeds 1.2, the modulus of elasticity in tension of the compression rubber layer in the lengthwise direction of the belt becomes much larger than the modulus of elasticity in tension of compression rubber layer in the widthwise direction of the belt, and the resulting power transmission belt is inferior in resistance to flexural fatigue in high temperature environment.

In particular, according to the invention, when the compression rubber layer is formed of vulcanizate of ethylene-α-olefin-diene rubber compound having an ethylene content of 60-80% by weight and the compression rubber layer contains no short fibers, and in addition, when the a and b satisfies the following relationship: $0.95 \leq a/b \leq 1.15$, then the resulting power transmission belt makes a reduced noise when it runs, and furthermore, it has much more excellent resistance to flexural fatigue in high temperature environment and a much longer flexural life than the conventional power transmission belt in which the compression rubber layer contains short fibers dispersed therein and oriented in the widthwise direction of the belt.

The unvulcanized rubber compound sheet which is to form an adhesion rubber layer or a compression rubber layer is obtained by mixing an ethylene-α-olefin-diene rubber mentioned above with a vulcanizing agent and, if necessary, common rubber chemicals such as carbon black, a vulcanization accelerator, an accelerator activator, a softener, and an antioxidant, and further if necessary, short fibers in the case of rubber compound to form a compression rubber layer, to prepare a rubber compound, and then by kneading the compound with an appropriate kneading means such as a Bambury's mixer, and rolling (sheeting) the kneaded product with a calender to an appropriate thickness.

When the sheet of unvulcanized rubber compound which is to form a compression rubber layer contains short fibers, they are oriented in the direction in which the rubber compound has been rolled, and accordingly, they are oriented in the lengthwise direction of the resulting belt, as mentioned hereinbefore. The lengthwise direction of the sheet of unvulcanized rubber compound is the same as that of lengthwise direction of the resulting belt. Therefore, according to the invention, when a compression rubber layer of a power transmission belt contains short fibers, they are oriented in the lengthwise direction of the belt.

The power transmission belt of the invention can be produced in a manner mentioned below by using a sheet of unvulcanized rubber compound which is to form a compression rubber layer, as mentioned above. One or more sheets of rubberized canvas and a sheet of unvulcanized rubber compound which is to form an adhesion rubber layer in which a plurality of load carrying cords are embedded are wound on the smooth surface of a molding cylinder, and then a sheet of unvulcanized rubber compound which is to form a compression rubber layer is wound on the sheet of unvulcanized rubber compound which is to form an adhesion rubber layer so that the lengthwise direction (rolled direction) of the sheet is coincident with the circumferential direction of the molding cylinder, followed by vulcanizing and bonding the sheets of unvulcanized rubber compound thus laminated together to form an integral body, thereby obtaining a power transmission belt.

In more detail, by way of example, a V-ribbed belt can be produced as follows. One or more sheets of rubberized canvas are wound on the smooth surface of a molding cylinder, and then a first sheet of unvulcanized rubber compound which is to form an adhesion rubber layer on the rubberized canvas so that the lengthwise direction (rolled direction) of the first sheet is coincident with the circumferential direction of the molding cylinder. Then, the load carrying cords are wound spirally on the first sheet of unvulcanized rubber compound which is to form an adhesion rubber layer and then a second sheet of unvulcanized rubber compound which is to form an adhesion rubber layer is wound on the first rubber sheet so that the lengthwise direction (rolled direction) of the second sheet is coincident with the circumferential direction of the molding cylinder. A third sheet of unvulcanized rubber compound which is to form a compression rubber layer is then wound on the second sheet of unvulcanized rubber compound which is to form an adhesion rubber layer, thereby preparing a cylindrical laminate. The cylindrical laminate is then heated under pressure in a vulcanizing vessel to effect vulcanization of the all the unvulcanized rubber sheets to provide a vulcanized annular product.

The annular product is installed on a belt driving system comprised of a driving roll and a driven roll and is driven to run under a predetermined tension while a plurality of ribs are formed on the surface of the annular product with a suitable grinding wheel. The annular product having the ribs thereon is then installed on a second belt driving system and is driven to run while it is cut in round slices having a predetermined width thereby providing V-ribbed belts.

In contrast, when a conventional power transmission belt having a compression rubber sheet in which short fibers are dispersed is to be produced, one or more sheets of rubberized canvas and a pair of sheets of unvulcanized rubber compound in which load carrying cords are embedded are wound on the surface of a molding cylinder, and then a sheet of unvulcanized rubber compound which is to form a compression rubber layer is wound so that the grain direction (rolled direction) of the sheet meets at right angles with the circumferential direction of the molding cylinder to prepare a compression rubber layer so that the short fibers contained in the compression rubber layer are oriented in the widthwise direction of the resulting belt, as mentioned hereinbefore, because the sheet of unvulcanized rubber compound containing short fibers therein has clear grain direction in the rolled direction (lengthwise direction).

Thus, in the production of power transmission belt of the invention, there is no need of winding a sheet of unvulcanized rubber compound to form a compression rubber layer on the surface of a molding cylinder so that the lengthwise direction (rolled or grain direction) of the sheet meets at right angles with the circumferential direction of the molding cylinder, unlike the conventional power transmission belt which has a compression rubber layer in which short fibers are dispersed and oriented in the direction of the widthwise direction As explained above, if a sheet of unvulcanized rubber compound which is to form a compression rubber layer contains short fibers, the amount of the short fibers is limited, and accordingly, a power transmission belt obtained using such a sheet of unvulcanized rubber compound which is to form a compression rubber layer has a small difference between the tensile characteristics in the lengthwise direction and the widthwise direction of the belt.

Thus, when a power transmission belt which has such an adhesion rubber layer and a compression rubber layer as mentioned hereinbefore is to be produced according to the invention, the modulus of elasticity in tension of the compression rubber layer a in the lengthwise direction of the resulting belt and the modulus of elasticity in tension of the compression rubber layer b in the widthwise direction of the resulting belt are so designed as to satisfy the relationship: $0.9 \leqq a/b \leqq 1.2$, while short fibers are not contained in the compression rubber layer, or in the case short fibers are contained in the compression rubber layer, the amount thereof is so limited as mentioned hereinbefore, thereby providing such a power transmission belt which makes only a small noise when it is running and is improved in resistance to flexural fatigue in high temperature environment. The compression rubber layer of the power transmission belt according to the invention has a modulus of elasticity usually in the range of 20-100 MPa and preferably in the range of 30-60 MPa in the lengthwise direction of the belt.

INDUSTRIAL AVAILABILITY OF THE INVENTION

The invention provides a power transmission belt in which short fibers are not contained in the compression rubber layer, or if they are contained, the amount thereof is remarkably reduced so that it can be produced with a reduced cost, and yet it runs with a reduced noise as well as it is superior in resistance to flexural fatigue in high temperature environment.

EXAMPLES

The invention will be described in more detail with reference to examples below, but the invention is not limited thereto. In the following examples and comparative examples, a rubber compound having the following composition of which amounts are indicated by parts by weight was rolled with a calender and used as a sheet of unvulcanized ethylene-α-olefin-diene rubber compound which was to form an adhesion rubber layer.

| (Sheet of unvulcanized ethylene-α-olefin-diene rubber compound to form an adhesion rubber layer) | |
|---|---|
| Ethylene-propylene-diene rubber (having an ethylene content of 56%) | 100 parts |
| HAF carbon | 50 parts |
| Silica | 20 parts |
| Paraffin oil | 20 parts |

-continued

| (Sheet of unvulcanized ethylene-α-olefin-diene rubber compound to form an adhesion rubber layer) | |
|---|---|
| Vulcanizing agent (oil sulfur) | 20 parts |
| Vulcanization accelerator DM | 1.4 parts |
| Vulcanization accelerator EZ | 0.6 parts |
| Vulcanization accelerator TT | 0.6 parts |
| Accelerator activator (stearic acid) | 1 part |
| Accelerator activator (zinc oxide) | 5 parts |
| Antioxidant 224 | 2 parts |
| Antioxidant MB | 1 part |
| Tackifier (petroleum resin) | 5 parts |

In the following examples and comparative examples, a rubber compound shown in Table 1 was rolled with a calender and used as an unvulcanized ethylene-α-olefin-diene rubber compound sheet to form a compression rubber layer.
(Preparation of RFL)

7.31 parts by weight of resorcin and 10.77 parts by weight of formalin (having a concentration of 37% by weight) were mixed together. An aqueous solution of sodium hydroxide (containing 0.33 parts by weight of sodium hydroxide) was added to the resulting mixture and stirred. Thereafter 160.91 parts by weight of water were added and the mixture was aged for 5 hours to provide an aqueous solution of resorcin-formalin resin (resorcin-formalin primary condensate, or RF resin) having a solid content of 6.40% by weight. Then, a chlorosulfonated polyethylene rubber (CSM) latex was added to the aqueous RF solution and the resulting mixture was aged for 12 hours to provide a resorcin-formalin-latex (RFL).
(Adhesion Treatment of Aramid Load Carrying Cords)

Aramid fiber cords (1000 de/1×3, having a first twisting coefficient of 859.9 and a final twisting coefficient of 863.3) prepared by first twisting of filaments and final twisting of the resulting strands were dipped in a toluene solution of isocyanate (having a solid content of 16% by weight of polymethylene polyphenyl polyisocyanate) and heated and dried at a temperature of 250° C. for 40 seconds to effect pretreatment of aramid fiber cords.

The thus pretreated aramid fiber load carrying cords were first dipped in the RFL as mentioned above and heated and dried at a temperature of 250° C. for 80 seconds to effect the first RFL treatment. The aramid fiber load carrying cords were then dipped in the RFL as mentioned above and heated and dried at a temperature of 250° C. for 80 seconds to effect the second RFL treatment.

The aramid fiber load carrying cords were then dipped in an adhesive solution (rubber cement) prepared by dissolving the same ethylene-propylene-diene rubber compound as that used to prepare the adhesion rubber layer and was heated and dried at a temperature of 60° C. for 40 seconds, thereby effecting adhesion treatment of the aramid fiber load carrying cords.

Example 1

Measurement of Modulus of Elasticity in Tension of Compression Rubber Layer

An unvulcanized ethylene-α-olefin-diene rubber compound to form a compression rubber layer shown in Table 1 was kneaded and rolled with a calender to prepare a sheet 0.6 mm thick. A pair of these sheets were placed and heated at a temperature of 160° C. for 25 minutes under pressure to effect vulcanization, thereby preparing a vulcanized rubber sheet 1 mm thick. A sample in the shape of dumbbell-A was punched out of the sheets according to the testing method of vulcanized rubber sheet prescribed in JIS K 6301.

The sample was subjected to measurement of modulus of elasticity in tension under a dynamic distortion of 1.0%, a frequency of 10 Hz and a load using a viscoelasticity measuring machine (FT Rheospectra available from Rheology).

The ratio a/b and the value of a are shown in Table 1 in which a is the modulus of elasticity in tension of the vulcanized rubber sheet in the lengthwise direction (corresponding to the lengthwise direction of the resulting belt) and b is the modulus of elasticity in tension of the vulcanized rubber sheet in the widthwise direction (corresponding to the widthwise direction of the resulting belt, that is, the direction to cross at right angles with the lengthwise direction of the vulcanized rubber sheet).
(Production of V-Ribbed Belt)

In the same manner as described hereinbefore, a sheet of rubberized canvas and a first sheet of unvulcanized ethylene-propylene-diene rubber compound to form an adhesion rubber layer were wound on the smooth surface of a molding cylinder, and then the adhesion-treated aramid fiber load carrying cords were wound spirally thereon, and then a second sheet of unvulcanized rubber compound to form an adhesion rubber layer, the same as the first sheet, was further wound.

Then, a third sheet of unvulcanized ethylene-propylene-diene rubber compound which was to form a compression rubber layer was wound on the second unvulcanized rubber sheet so that the lengthwise direction was coincident with the circumferential direction of the molding cylinder to form a cylindrical laminate. The cylindrical laminate was then steam-vulcanized by heating at a temperature of 165° C. under an inner pressure of 6 kgf/cm$^2$ and an outer pressure of 9 kgf/cm$^2$ for 35 minutes in a vulcanization vessel to provide an annular product.

The annular product was manufactured to provide a V-ribbed belt which had load carrying cords embedded in the adhesion rubber layer and had the canvas on the adhesion rubber layer and the compression rubber layer having three ribs on the lower face of the adhesion rubber layer and a length of 1000 mm.

The performance of the thus obtained V-ribbed belt was examined in a manner as follows, in which a pulley made of S45C and having V-ribbed grooves corresponding to the belt was used.
(Measurement of Noise Made when the Belt was Running)

Figure 2:
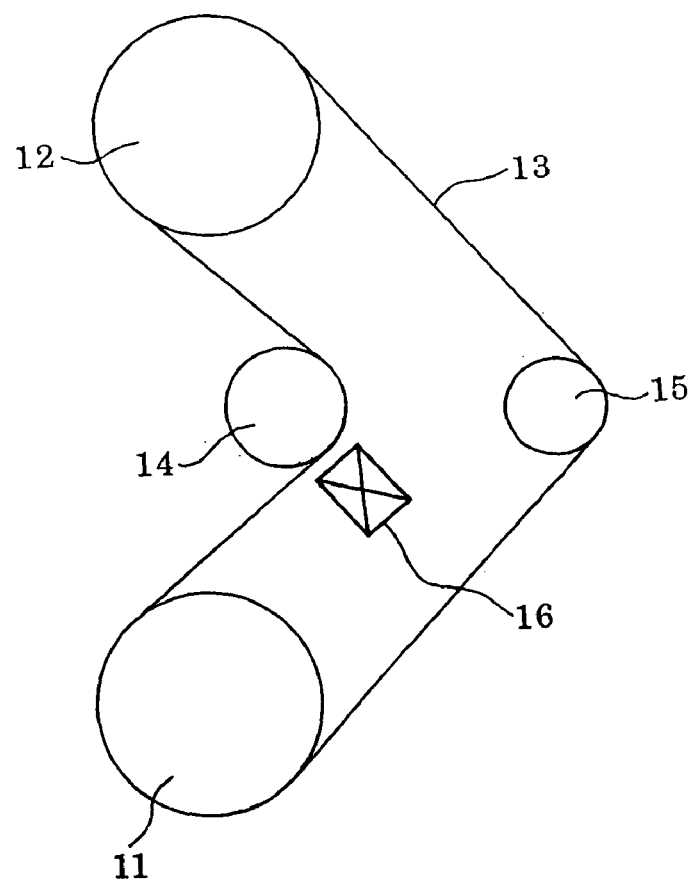
FIG. 2 shows a belt driving system to examine to what degree a power transmission belt makes a noise and how long the belt withstands flexural fatigue when it is running.

As shown in FIG. 2, the V-ribbed belt 13 was installed on a belt driving system comprised of a driving pulley 11 (having a diameter of 120 mm), a driven pulley 12 (having a diameter of 120 mm), an idler pulley 12 (having a diameter of 70 mm) and a tension pulley 15 (having a diameter of 50 mm) with the idler pulley and the tension pulley placed between the driving pulley and the driven pulley so that the traveling direction of the belt curved almost at right angles halfway between the driving pulley and the driven pulley. A noise meter 16 was placed in the neighborhood of the idler pulley.

Using the belt driving system mentioned above, sound pressure (dB) was examined while the V-ribbed belt was driven to run for 300 hours by driving the driving pulley to rotate at 4900 rpm while a tension of 979N was applied to the tension pulley and no load was applied to the driven pulley. The results are shown in Table 1. Under the experimental conditions as employed above, when the sound pressure is 80 dB or less, the noise the V-ribbed belt actually makes when it is running can be said to be low, and it is preferable that the sound pressure is not more than 75 dB.
(Measurement of Flexural Life of the Belt in High Temperature Environment)

Using the belt driving system mentioned above as shown in FIG. 2, at an ambient temperature of 120° C., the V-ribbed belt was driven to run by driving the driving pulley to rotate at 4900 rpm while a tension of 979N was applied to the tension pulley in the horizontal direction and a load of 2 kW/rib was applied to the driven pulley. The V-ribbed belt was stopped at fixed interval of time to examine the surface of the ribs of the belt. The time (hours) until cracks were observed on the rib with naked eyes was measured and taken as the flexural life of the belt. The results are shown in Table 1.

Example 2 to 7

The unvulcanized ethylene-α-olefin-diene rubber compound to form a compression rubber layer shown in Example 2 to 7 of Table 1 was used and otherwise in the same manner as Example 1, a vulcanized rubber sheet was obtained, and the modulus of elasticity in tension of the sheet was measured. Further, in the same manner as Example 1, a V-ribbed belt was manufactured and the noise it made when it ran and the flexural life of the belt were examined. The results are shown in Table 1.

Comparative Example 1 and 2

The unvulcanized ethylene-α-olefin-diene rubber compound to form a compression rubber layer shown in Comparative Example 1 and 2 of Table 1 was used and otherwise in the same manner as Example 1, a vulcanized rubber sheet was obtained, and the modulus of elasticity in tension of the sheet was measured. Further, in the same manner as Example 1, a V-ribbed belt was manufactured and the noise that it made when it ran and the flexural life of the belt were examined. The results are shown in Table 1.

Comparative Example 3

In the same manner as Example 1, a sheet of rubberized canvas and a first sheet of unvulcanized ethylene-propylene-diene rubber compound to form an adhesion rubber layer were wound on the smooth surface of a molding cylinder, and then the adhesion-treated aramid fiber load carrying cords were wound spirally thereon, and then a second sheet of unvulcanized rubber compound to form an adhesion rubber layer was further wound.

Then, a third sheet of unvulcanized ethylene-propylene-diene rubber sheet to form a compression rubber layer as shown in Comparative Example 3 of Table 1 was wound on the second sheet of unvulcanized rubber compound so that the lengthwise direction of the third sheet met the circumferential direction of the molding cylinder at right angles to form a cylindrical laminate. The cylindrical laminate was vulcanized with peroxide by heating at a temperature of 165° C. under an inner pressure of 6 kgf/cm$^2$ and an outer pressure of 6 kgf/cm$^2$ for 35 minutes in a vulcanization vessel to provide an annular product. A V-ribbed belt was manufactured in the same manner as Example 1 and the noise it made and the flexural life of the belt when it ran were examined. The results are shown in Table 1.

An unvulcanized ethylene-α-olefin-diene rubber compound to form a compression rubber layer shown in Comparative Example 3 of Table 1 was kneaded and rolled with a calender to prepare a sheet 0.6 mm thick. A pair of these sheets was vulcanized using a peroxide by heating at a temperature of 160° C. for 25 minutes under pressure to prepare a vulcanized rubber sheet 1 mm thick. The resulting vulcanized rubber sheet was subjected to measurement of the value of a (modulus of elasticity in tension in the grain direction of the sheet (i.e., lengthwise direction of the resulting belt) and the value of b (modulus of elasticity in tension in the widthwise direction of the sheet (i.e., the widthwise direction of the resulting belt, or the direction crossing the grain direction at right angles) in the same manner as Example 1. The value of a and the a/b ratio are shown in Table 1.

As clear from the results shown in Table 1, the power transmission belt of the invention contains no short fibers in the compression rubber layer, or if the belt contains short fibers in the compression rubber layer, the amount of the short fibers is not more than 5 parts by weight in relation to 100 parts by weight of the rubber component, and the short fibers are oriented in the widthwise direction of the resulting belt. Thus, the power transmission belt of the invention makes a noise that is substantially at the same level as the conventional belt in which short fibers are oriented in the widthwise direction of the belt Comparative Example 3).

In addition, the power transmission belt of the invention is superior in resistance to flexural fatigue in high temperature environment, and according to preferred embodiments of the invention (Examples 1-3), it is much improved in resistance to flexural fatigue as compared with the conventional power transmission belt. Hence, the power transmission belt of the invention has much longer flexural life than the conventional power transmission belt. However, when short fibers are contained in the compression rubber layer in an amount of more than 5 parts by weight in relation to 100 parts by weight of the rubber component in the compression rubber layer and they are oriented in the lengthwise direction of the belt to be manufactured, the resulting belt has a value of a/b ratio of more than 1.2, and hence the flexural life of the belt in high temperature environment is short (Comparative Examples 1 and 2).

Moreover, the power transmission belt of the invention can be manufactured using no short fibers in a compression rubber layer, or if short fibers are contained in a compression rubber layer, they are oriented in the lengthwise direction of the resulting belt. Accordingly, the power transmission belt of the invention can be manufactured in a less costly manner with manufacturing steps simplified and reduced in number, in contrast to the manufacture of the conventional power transmission belt in which short fibers are oriented in the widthwise direction of the belt.

TABLE 1

|  | Examples | | | | | | | Comparative Examples | | |
| --- | --- | --- | --- | --- | --- | --- | --- | --- | --- | --- |
|  | 1 | 2 | 3 | 4 | 5 | 6 | 7 | 1 | 2 | 3 |
| EPDM Rubber Compound*) | | | | | | | | | | |
| EPDM Ethylene content 58% |  |  |  |  | 100 | 100 |  |  |  |  |
| Ethylene content 60% |  |  | 100 |  |  |  |  |  |  |  |
| Ethylene content 70% | 100 |  |  |  |  |  | 100 | 100 | 100 | 100 |

TABLE 1-continued

|  | Examples | | | | | | | Comparative Examples | | |
| --- | --- | --- | --- | --- | --- | --- | --- | --- | --- | --- |
|  | 1 | 2 | 3 | 4 | 5 | 6 | 7 | 1 | 2 | 3 |
| Ethylene content 80% |  | 100 |  |  |  |  |  |  |  |  |
| Ethylene content 85% |  |  |  | 100 |  |  |  |  |  |  |
| Carbon black (HAF) | 65 | 65 | 65 | 65 | 65 | 65 | 65 | 65 | 65 | 65 |
| Paraffin oil | 10 | 10 | 10 | 10 | 10 | 10 | 10 | 10 | 10 | 10 |
| Stearic acid | 1 | 1 | 1 | 1 | 1 | 1 | 1 | 1 | 1 | 1 |
| Zinc oxide | 5 | 5 | 5 | 5 | 5 | 5 | 5 | 5 | 5 | 5 |
| Antioxidant | 3 | 3 | 3 | 3 | 3 | 3 | 3 | 3 | 3 | 3 |
| Dicumyl peroxide | 2.5 | 2.5 | 2.5 | 2.5 | 2.5 | 2.5 | 2.5 | 2.5 | 2.5 | 2.5 |
| Nylon 6 short fibers |  |  |  |  |  |  | 3 | 6 | 20 | 20 |
| UHMWPE*[2] |  |  |  |  |  | 10 |  |  |  |  |
| Properties of Belt |  |  |  |  |  |  |  |  |  |  |
| Modulus of elasticity in tension (a) (MPa) | 35 | 37 | 33 | 42 | 30 | 45 | 52 | 80 | 110 | 35 |
| Ratio of modulus of elassticity in tension (a/b) | 1.05 | 0.96 | 1.15 | 1.08 | 1.10 | 1.20 | 1.20 | 1.70 | 3.0 | 0.35 |
| Flexural life (h) | 1200 | 1050 | 1350 | 850 | 1400 | 1000 | 890 | 750 | 420 | 1000 |
| Sound pressure (db) | 67 | 65 | 72 | 65 | 80 | 68 | 65 | 65 | 68 | 64 |

NOTES
*[1]Parts by weight
*[2]Ultra high molecular weight polyethylene

The invention claimed is:

1. A V-ribbed belt, comprising:
an adhesion rubber layer which is formed of a vulcanizate of an ethylene-α-olefin-diene rubber compound wherein the ethylene-α-olefin-diene rubber has an ethylene content of 50-60% by weight, and which has a plurality of load carrying cords formed of fiber cords adhered to and embedded therein; and
a compression rubber layer which is formed of a vulcanizate of an ethylene-α-olefin-diene rubber compound wherein the ethylene-α-olefin-diene rubber has an ethylene content of 55-85% by weight,
wherein the compression rubber layer contains no short fibers or contains short fibers that are oriented in the lengthwise direction of the belt and present in an amount of not more than 5 parts by weight in relation to 100 parts by weight of the ethylene-α-olefin-diene rubber in the compression rubber layer,
wherein the compression rubber layer has a modulus of elasticity in tension of A in the lengthwise direction of the belt and a modulus of elasticity in tension of B in the widthwise direction of the belt, and A and B satisfy the relationship: $0.9<A/B<1.2$, and
wherein the compression rubber layer comprises a vulcanizate of an ethylene-α-olefin-diene rubber compound which comprises ultra high molecular weight polyethylene, and the ethylene-α-olefin-diene rubber compound has an ethylene content of not less than 55% by weight and less than 60% by weight and the content of the ultra high molecular weight polyethylene in the compound is 1-50 parts by weight in relation to 100 parts by weight of the ethylene-α-olefin-diene rubber.

2. The V-ribbed belt according to claim 1, wherein the short fibers in the compression rubber layer have a fiber diameter of 10-100 μm and a fiber length of 0.1-5 mm.

* * * * *